US012663384B2

(12) United States Patent
Jung et al.

(10) Patent No.: US 12,663,384 B2
(45) Date of Patent: Jun. 23, 2026

(54) INSPECTION DEVICE FOR THE APPEARANCE OF POGO PINS

(71) Applicant: ENSCAPE CO., LTD., Yongin-si (KR)

(72) Inventors: Dong Hyun Jung, Hwaseong-si (KR); Ji Man Ryu, Suwon-si (KR); Seong Gi Kim, Cheonan-si (KR); In Ho Ka, Seongnam-si (KR); Hyeok Gi Gwon, Yongin-si (KR); Sang Jin Choi, Seongnam-si (KR); Sang Baek Kim, Seongnam-si (KR)

(73) Assignee: ENSCAPE CO., LTD., Yongin-si (KR)

( * ) Notice: Subject to any disclaimer, the term of this patent is extended or adjusted under 35 U.S.C. 154(b) by 94 days.

(21) Appl. No.: 18/946,154

(22) Filed: Nov. 13, 2024

(65) Prior Publication Data

US 2026/0036527 A1    Feb. 5, 2026

(30) Foreign Application Priority Data

Jul. 30, 2024    (KR) ........................ 10-2024-0100842

(51) Int. Cl.
| | |
|---|---|
| *G01N 21/952* | (2006.01) |
| *G01N 21/88* | (2006.01) |
| *H04N 23/56* | (2023.01) |
| *H04N 23/90* | (2023.01) |

(52) U.S. Cl.
CPC ....... *G01N 21/952* (2013.01); *G01N 21/8806* (2013.01); *H04N 23/56* (2023.01); *H04N 23/90* (2023.01); *G01N 2201/021* (2013.01)

(58) Field of Classification Search
CPC ................................................. G01N 21/952
See application file for complete search history.

(56) References Cited

U.S. PATENT DOCUMENTS

| | | | |
|---|---|---|---|
| 2007/0055294 A1 | 3/2007 | Giap | |
| 2016/0231253 A1* | 8/2016 | Nygaard | ................. B07C 5/342 |
| 2017/0307541 A1* | 10/2017 | Offenborn | ............... B07C 5/342 |
| 2020/0363343 A1* | 11/2020 | Nygaard | ........... G01B 11/2433 |
| 2023/0337746 A1* | 10/2023 | Cole | ....................... A24F 40/70 |

FOREIGN PATENT DOCUMENTS

| | | |
|---|---|---|
| CN | 110702345 A | 1/2020 |
| JP | 2018-151243 A | 9/2018 |
| JP | 2022-61439 A | 4/2022 |
| JP | 2024-39552 A | 3/2024 |
| KR | 10-1204273 B1 | 11/2012 |
| KR | 10-2440982 B1 | 9/2022 |
| KR | 10-2024-0039569 A | 3/2024 |
| TW | 202043752 A | 12/2020 |

* cited by examiner

*Primary Examiner* — Mainul Hasan
*Assistant Examiner* — Christopher Kingsbury Glover

(57) ABSTRACT

Disclosed is an inspection device for an appearance of a pogo pin, including: a seating portion configured to seat the pogo pin thereon; a pogo pin posture adjuster configured to adjust a posture of the pogo pin based on magnetic force by adjusting a position of a magnet placed under the seating portion; a rotation unit configured to rotate the seating portion; a coaxial aligner configured to coaxially align a rotation center of the pogo pin with the rotation unit; and at least one vision module configured to acquire images of the pogo pin seated on the seating portion. According to the disclosure, the inspection device for the appearance of the pogo pins ensures the accuracy and speed in inspecting the appearance of the pogo pin.

13 Claims, 15 Drawing Sheets

1000

600: 610, 620, 630

310

INSPECTION DEVICE FOR THE APPEARANCE OF POGO PINS

CROSS REFERENCE TO RELATED APPLICATION

Priority to Korean Patent Application No. 10-2024-0100842 filed on Jul. 30, 2024, the entire disclosure of which is incorporated by reference herein, is claimed.

BACKGROUND OF THE INVENTION

Field of the Invention

The disclosure relates to a device for inspecting whether there is a defect in the appearance of a pogo pin.

Description of the Related Art

A method of optically inspecting the surface of a cylindrical object refers to a method of generally using an optical system such as a camera, lighting, and a laser to visually analyze defects or irregularities on the surface.

With development of artificial intelligence (AI), Internet of things (IoT), big data, etc. the transition to a data economy is rapidly increasing a demand for semiconductors in various industrial fields such as autonomous vehicles, robots, 5G wireless communication, and mobile home appliances. In a semiconductor process, pogo pins are required as a key component for testing the performance and reliability of a semiconductor. In connection with the pogo pins, Korean Patent No. 1204273 has been disclosed.

The pogo pins are produced in various specifications to have a minimum diameter of about 0.15 mm and a minimum length of 1 mm. Till now, the appearance of the pogo pin has been inspected with the naked eyes using a microscope, and classification work has also been carried out manually, thereby resulting in a problem of lowering a production efficiency.

To solve the conventional problem, a device for automatically inspecting the appearance of the pogo pin is needed, and a device for aligning the position of the pogo pin is also essentially needed.

The foregoing problem arises in not only the pogo pins but also small electronic components.

DOCUMENTS OF RELATED ART (Patent Document 1) Korean Patent No. 1204273 (published on Nov. 23, 2012)

SUMMARY OF THE INVENTION

An aspect of the disclosure is to provide an inspection device for the appearance of pogo pins, which can solve the conventional problem that the appearance of the pogo pins are carried out manually.

According to the disclosure, there is provided an inspection device for an appearance of a pogo pin, including: a seating portion configured to seat the pogo pin thereon; a pogo pin posture adjuster configured to adjust a posture of the pogo pin based on magnetic force by adjusting a position of a magnet placed under the seating portion; a rotation unit configured to rotate the seating portion; a coaxial aligner configured to coaxially align a rotation center of the pogo pin with the rotation unit; and at least one vision module configured to acquire images of the pogo pin seated on the seating portion.

Meanwhile, the vision module may include a first vision module configured to acquire images of the pogo pin from a lateral side.

Further, the first vision module may include a first camera and a rear lighting unit provided on one side of an inspection area.

Further, the first vision module may include a first lighting unit configured to irradiate light toward a lateral surface of the pogo pin.

Meanwhile, the posture adjuster and the coaxial aligner may operate based on a silhouette image of the pogo pin acquired while operating the rear lighting unit.

Meanwhile, the posture adjuster and the coaxial aligner may operate based on a silhouette image acquired at least one angle of the pogo pin.

Further, the posture adjuster may be configured to rotate depending on the rotation unit.

Meanwhile, rotate a the rotation unit may predetermined angle to change an angle of the pogo pin, and the first vision module may operate to acquire a silhouette image whenever the pogo pin is rotated a predetermined angle.

Further, the vision module may be configured to acquire images of the pogo pin while the pogo pin is uprightly erected.

Further, the first vision module may operate to acquire lateral-view images of the pogo pin while the first lighting unit is operating.

Meanwhile, the vision module may include a second vision module configured to acquire images of the pogo pin from above.

Further, the second vision module may include a second camera, and a second lighting unit configured to irradiate light toward a top surface of the pogo pin.

Meanwhile, the pogo pin posture adjuster may include: a first adjusting unit configured to adjust a position of the magnet in a first direction on a horizontal plane; and a second adjusting unit configured to adjust the position of the magnet in a second direction perpendicular to the first direction.

Meanwhile, the first adjusting unit may include a first upper portion, a first lower portion, and a guide configured to restrict a direction in which the first upper portion moves relative to the first lower portion.

Meanwhile, the second adjusting unit may include a second upper portion, a second lower portion, and a guide configured to restrict a direction in which the second upper portion moves relative to the second lower portion.

DETAILED DESCRIPTION OF THE INVENTION

Figure 1:
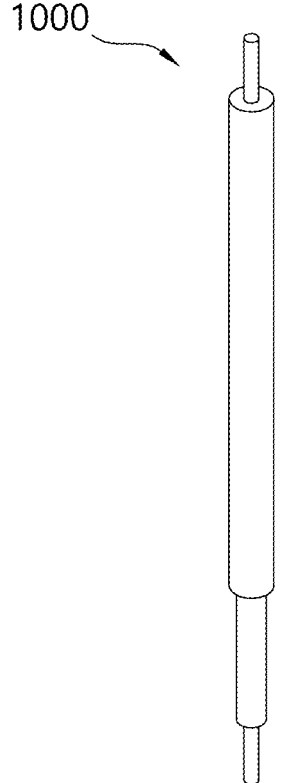
FIG. 1 is a perspective view showing an example of a pogo pin to be inspected according to the disclosure.

Below, an inspection device for the appearance of pogo pins according to an embodiment of the disclosure will be described in detail with reference to the accompanying drawings. In the following description, the names of components used may be referred to as other names in this art. However, these components may be considered as equivalent components in alternative embodiments if they are functionally similar or identical to each other. Further, the reference numerals of the components are merely given for the convenience of description. However, the components indicated by the reference numerals in the accompanying drawings are not limited by those shown therein. Likewise, if components are functionally similar or identical to each other even though they are partially modified in the drawings according to alternative embodiments, the components may be considered as the equivalent components. Further, if components are recognized as components that should be included at the level of those skilled in the art, descriptions thereof will be omitted.

FIG. 1 is a perspective view showing an example of a pogo pin 1000 to be inspected according to the disclosure.

According to the disclosure, an electronic component to be aligned in position is formed to extend a predetermined length and have magnetism. For example, as shown in FIG. 1, the electronic component according to the disclosure may be a pogo pin. The pogo pin 1000 is generally shaped like a cylinder, of which a curved lateral surface, a top surface, and a bottom surface need to undergo an appearance inspection. In particular, the pogo pin 1000 is required to rotate 360 degrees for the appearance inspection because its lateral surface is curved.

Meanwhile, a vision camera module is generally used to perform the appearance inspection. When two conditions are satisfied while rotating the pogo pin 1000 to perform the appearance inspection for the lateral surface of the pogo pin 1000, the accuracy of the appearance inspection may be improved. The first condition is that the pogo pin 1000 is uprightly erect in a vertical direction, and the second condition is that the center of the pogo pin 1000 and the rotation center for rotating the pogo pin 1000 are coaxially aligned. To satisfy the foregoing two conditions, mechanical alignment may be taken into account. However, a mechanism (e.g., a gripper) for the alignment may obscure the appearance of the pogo pin 100. In particular, there is a disadvantage that the smaller the size of an object, such as the pogo pin 1000, the larger the proportion of its appearance obscured by the gripper. Meanwhile, if the mechanism is miniaturized to minimize the area of the appearance of the pogo pin 1000 hidden by the mechanism, stress may focus on the miniaturized mechanism and damage the pogo pin 1000.

Accordingly, an electronic component alignment device according to the disclosure is configured to change and align the posture of the pogo pin 1000 without contact.

Figure 2:
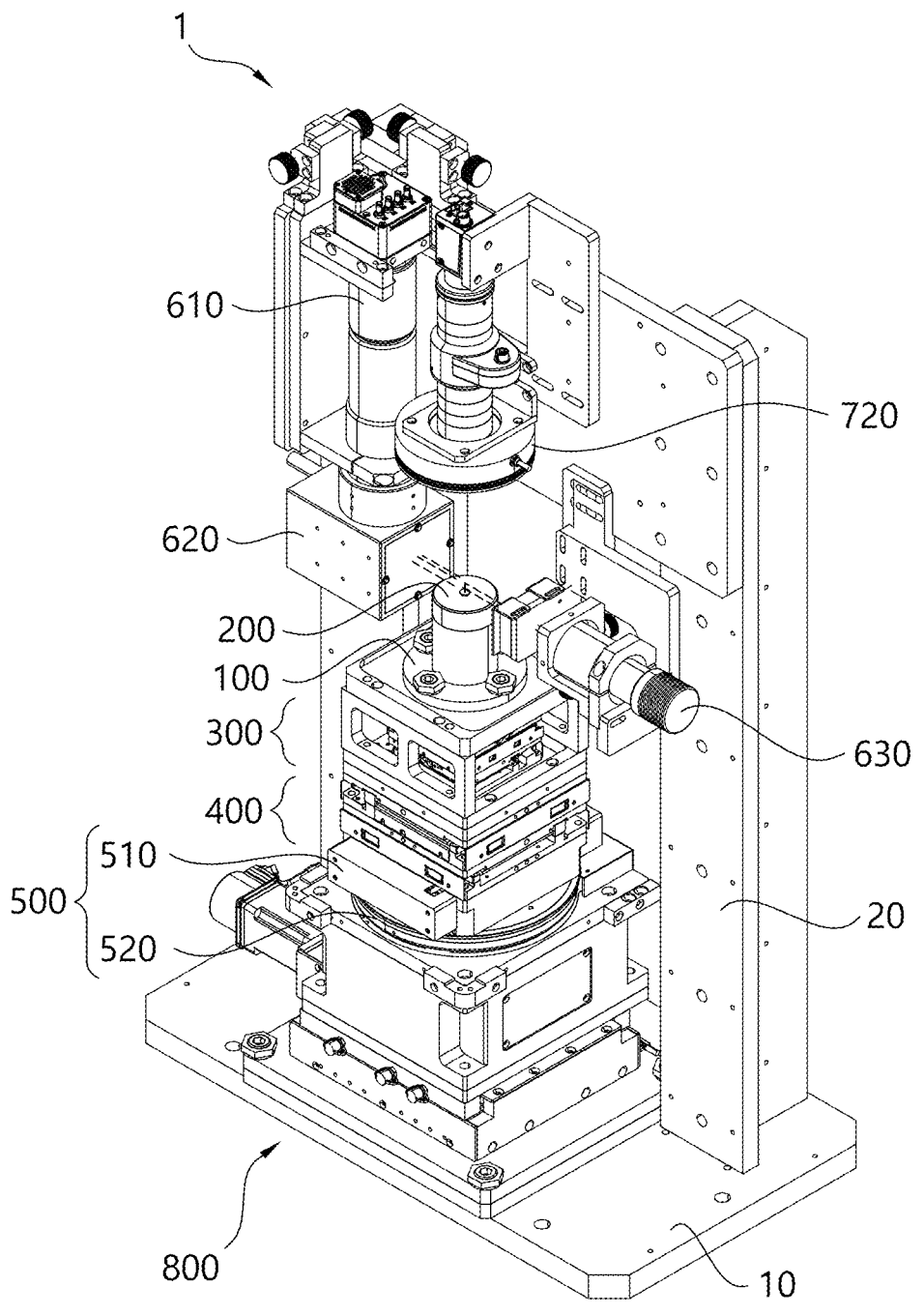
FIG. 2 is a perspective view of an inspection device for the appearance of pogo pins according to an embodiment of the disclosure.
Figure 3:
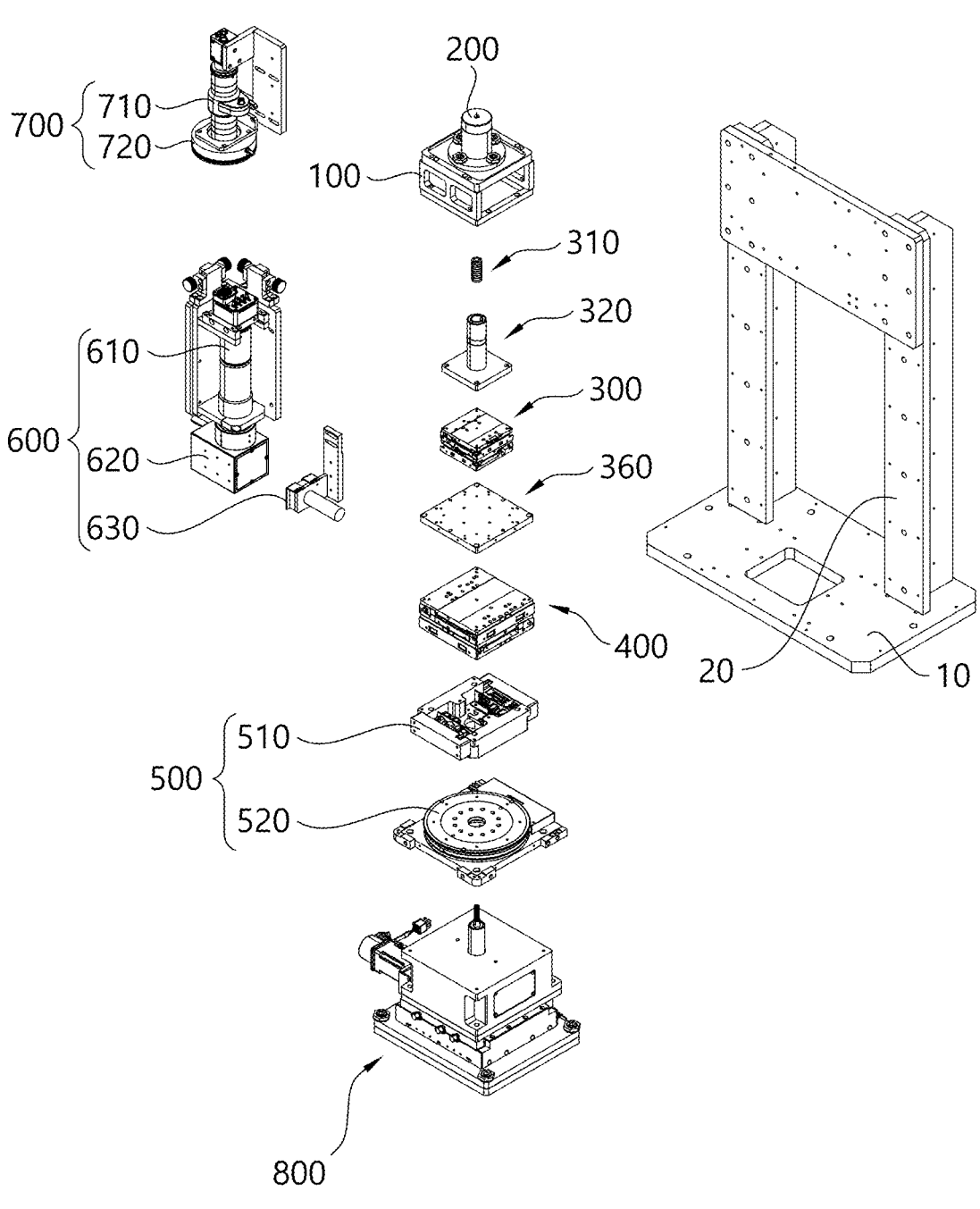
FIG. 3 is an exploded perspective view of an inspection device for the appearance of pogo pins according to an embodiment of the disclosure.
Figure 4:
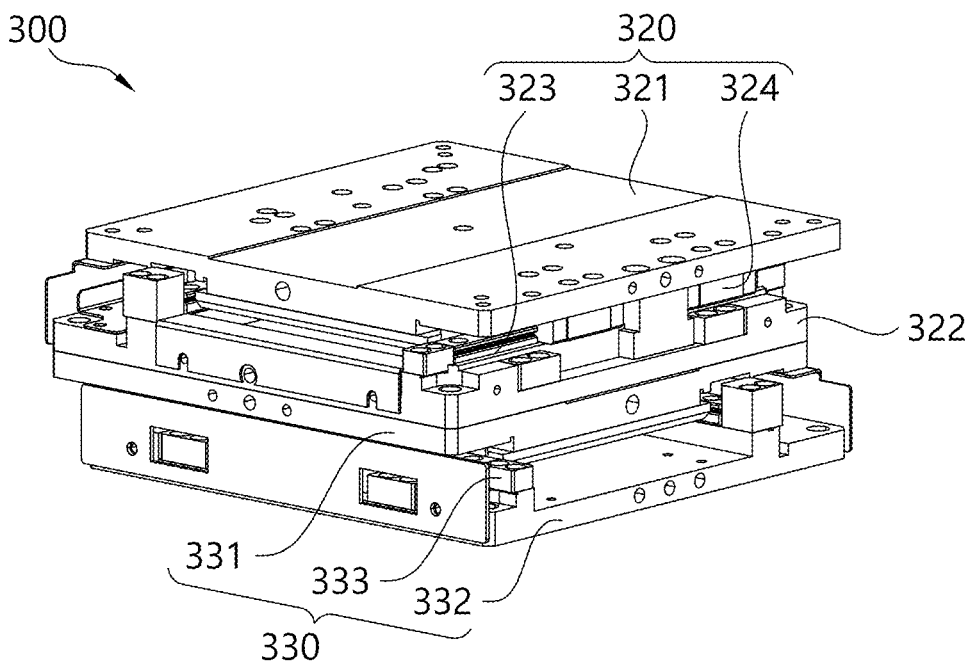
FIG. 4 is a perspective view of a posture adjuster.

FIG. 2 is a perspective view of an inspection device 1 for the appearance of pogo pins according to an embodiment of the disclosure, FIG. 3 is an exploded perspective view of the inspection device 1 for the appearance of pogo pins according to an embodiment of the disclosure, and FIG. 4 is a perspective view of a posture adjuster 300.

Referring to FIGS. 2 to 4, the inspection device 1 for the appearance of the pogo pins according to the disclosure may include a lower frame 10, a vertical frame 20, a seating portion 200, a posture adjuster 300, a coaxial aligner 400, a rotation unit 500, a vision module, a focus adjuster 800, an image processor (not shown), and a controller (not shown).

The lower frame 10 and the vertical frame 20 are used as a base to which the components to be described later will be mounted. The lower frame 10 may extend in a horizontal direction to have a predetermined size. The vertical frame 20 may be coupled to onside of the lower frame 10, and extend a predetermined length in a vertical direction.

The seating portion 200 is configured to seat the pogo pin 1000 on the top surface thereof. At least a portion of the top surface of the seating portion 200 may be configured to have a predetermined area and support an longitudinal end portion of the pogo pin 1000. The seating portion 200 transmits the magnetic force of a magnet 310 (to be described later) so that the pogo pin 1000 can be seated thereon having an approximately uprightly erect posture.

The seating portion 200 may be coupled to an upper portion of a holding frame 100. The holding frame 100 may be provided at a predetermined height in the vertical direction, and have a space for accommodating the posture adjuster 300 (to be described later) therein. Further, a lower portion of the holding frame 100 may be coupled to the coaxial aligner 400 (to be described later).

The top surface of the seating portion 200 may be configured to prevent the distal end of the pogo pin 1000 being in contact therewith from slipping over thereon. The top surface of the seating portion 200 may be treated to increase friction.

The posture adjuster 300 is configured to adjust the posture of the pogo pin 1000 seated on the seating portion 200. The posture adjuster 300 is configured to adjust the pogo pin 1000 to be uprightly erect on the seating portion 200.

The posture adjuster 300 may be provided under the seating portion 200 and configured to horizontally move relative to the seating portion 200.

The posture adjuster 300 may include the magnet 310, a magnet holder 311, a first adjusting unit 320, and a second adjusting unit 330.

The magnet 310 is provided under the seating portion 200, and configured to transmit the magnetic force to the pogo pin 1000 seated on the top of the seating portion 200. The magnet 310 may include one or more magnets. The magnet holder 311 may arrange at least one magnet 310 brick by brick in the vertical direction. The top of the magnet holder 311 may be spaced apart from the bottom of the seating portion 200. The position of the magnet holder 311 may be adjusted depending on change in the position of the first adjusting unit 320 (to be described later).

The first adjusting unit 320 may be configured to horizontally move the position of the magnet 310 along a first direction. The first adjusting unit 320 may include a first upper portion 321 and a first lower portion 322. The first upper portion 321 and a second lower portion 332 may be provided as flat plates, respectively. The first upper portion 321 and the first lower portion 322 may be coupled by a guide 323 to restrict their moving directions. Between the first upper portion 321 and a second upper portion 331 may be provided a first actuator 324 to adjust a relative position between the first upper portion 321 and the first lower portion 322.

The second adjusting unit 330 may be configured to horizontally move in a second direction perpendicular to the moving direction of the first adjusting unit 320. The second adjusting unit 330 may include the second upper portion 331 and the second lower portion 332. The second upper portion 331 may engage with the first lower portion 322 of the first adjusting unit 320. The second upper portion 331 and the second lower portion 332 may be coupled by a guide to move in the second direction. Between the second upper portion 331 and the second lower portion 332 may be provided a second actuator to adjust the position of the second upper portion 331.

Meanwhile, the first actuator 324 and the second actuator according to the disclosure may include linear motors, but are not limited thereto. Alternatively, a ball-screw mechanism or the like actuator for linear movement may be used.

However, such a configuration of the posture adjuster 300 is merely an example, and may be implemented as modified in various ways as long as it can adjust the horizontal position of the magnet 310.

The coaxial aligner 400 is provided to coaxially align the center of the pogo pin 1000 and the rotation center when the pogo pin 1000 is uprightly erect. The coaxial aligner 400 may include a first alignment unit and a second alignment unit.

An upper portion of the first alignment unit and a lower portion of the second adjusting unit 330 may be coupled to each other with a coupling plate 360 therebetween. The second alignment unit may be coupled to a lower portion of the first alignment unit. A lower portion of the second alignment unit may be coupled to a rotation table 510.

The configurations of the first alignment unit and the second alignment unit may be similar to those of the first adjusting unit 320 and the second adjusting unit 330 linearly moving on a horizontal plane. In other words, the upper unit may be configured to linearly move on the lower unit. Further, the actuator may be provided between the upper unit and the lower unit to move the upper unit linearly.

The coaxial aligner 400 may operate to adjust the horizontal position of the central axis of the pogo pin 1000 within a predetermined range, thereby coaxially aligning the central axis of the pogo pin 1000 with the rotation center of the rotation unit 500.

The rotation unit 500 may be configured to adjust the angle of the coaxial aligner 400, the posture adjuster 300, and the seating portion 200. When the rotation unit 500 rotates the coaxial aligner 400, the posture adjuster 300 and the seating portion 200 may be rotated together at the same angle.

The rotation unit 500 may include the rotation table 510, and a rotation actuator 520. The top of the rotation table 510 may be coupled to the coaxial aligner 400. The bottom of the rotation actuator 520 may be coupled to the focus adjuster 800.

The rotation table 510 may be configured to be infinitely rotated by the rotation actuator 520. However, this configuration is merely an example, and may be modified to operate within a certain rotation angle by a wire-type connector. However, even in this case, it is ensured that the rotation table 510 rotates at least 360 degrees.

The vision module 600 is configured to acquire the images of the pogo pin 1000 seated on the seating portion 200. The vision module may include a first vision module 600 to acquire a lateral-view image of the pogo pin 1000, and a second vision module 700 to acquire a top-view image of the pogo pin 1000.

The first vision module 600 may include a first camera 610, a first lighting unit 620, and a rear lighting unit 630.

The first camera 610 may include an image sensor and a lens kit.

The rear lighting unit 630 and the first camera 610 may be horizontally placed on both sides with the pogo pin 1000 seated on the seating portion 200 therebetween. The first lighting unit 620 may be coupled to the first camera 610. Further, the first lighting unit 620 may be configured as lighting provided coaxially with a camera.

The second vision module 700 may include a second camera 710, and a second lighting unit 720. The second camera 710 may be provided vertically above the seating portion 200. The pogo pin 1000 may be varied in horizontal position depending on the operations of the coaxial aligner 400, but the second camera 710 may be configured to acquire the top-view image of the pogo pin 1000 even though the position of the pogo pin 1000 is changed. The second lighting unit 720 may be coupled to the second camera 710.

The focus adjuster 800 may be configured to move on the lower frame 10 in a certain direction. The focus adjuster 800 is configured to make the lateral surface of the pogo pin be positioned at the focus of the first camera 610 according to the thicknesses of various pogo pins. The focus adjuster 800 may simultaneously move the rotation unit 500, the coaxial aligner 400, the posture adjuster 300, and the seating portion 200, along a direction in which the first camera 610 faces the rear lighting unit 630.

Meanwhile, the inspection device 1 for the appearance of the pogo pins according to the disclosure may include the image processor (not shown) and the controller (not shown).

The image processor is configured to identify whether there is a defect in the appearance of the pogo pin 1000 based on the lateral- and top-view images of the pogo pin 1000. The image processor may stitch the lateral-view images taken at various angles into a completely planar inspection image corresponding to one revolution. The image processor may detect the presence of a defect based on the inspection image.

The controller may control the pogo pin 1000 to be adjusted in posture and aligned coaxially based on the image acquired by the vision module. After the pogo pin 1000 is uprightly erected and coaxially aligned, the controller may control the vision modules and a rotation actuator 530 to acquire the images of the pogo pin 1000 at various angles.

Figure 5A:
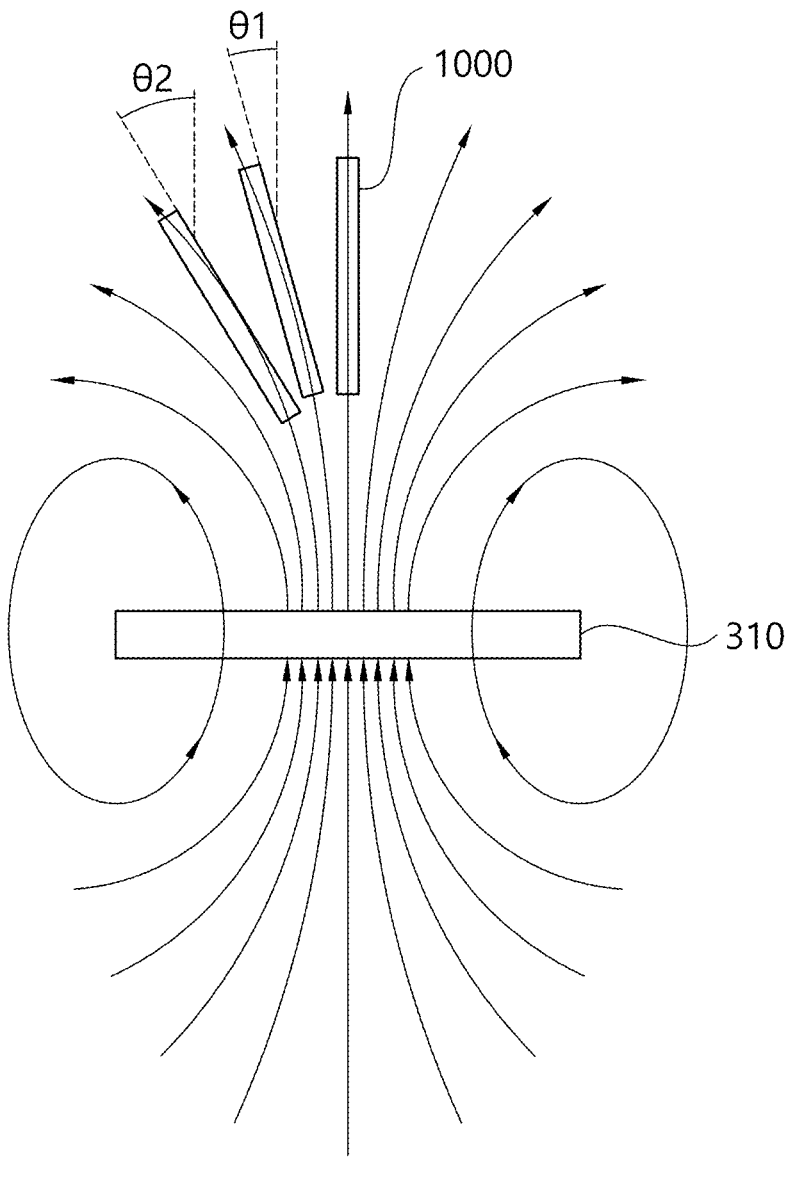
FIGS. 5A and 5B are conceptual views showing a magnet provided in a posture adjuster according to the disclosure and the lines of magnetic force.
Figure 5B:
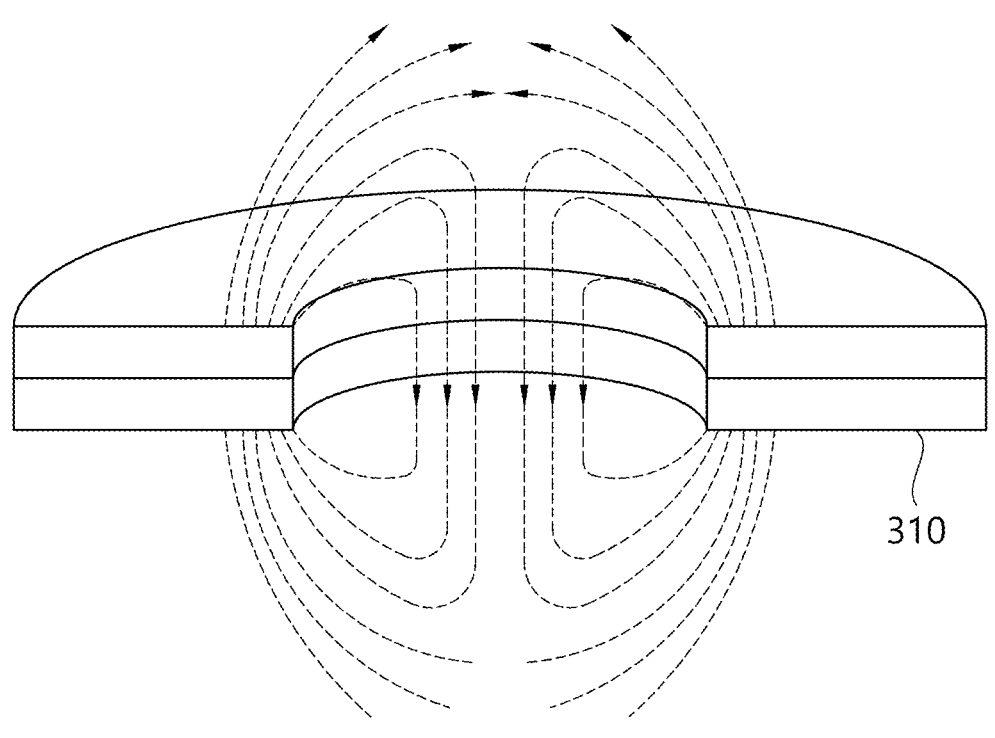

FIGS. 5A and 5B are conceptual views showing the magnet 310 provided in the posture adjuster 300 according to the disclosure and the lines of magnetic force.

Referring to FIG. 5A, the magnet 310 according to an embodiment of the disclosure is shaped like a disc, and the pogo pin 1000 may receive magnetic force in different directions corresponding to its relative positions from the center of the magnet 310. In the center of the magnet 310, the lines of magnetic force are formed in approximately vertical directions. As a distance from the center of the magnet 310 increases, slopes θ1 and θ2 of the lines of magnetic force may increase. Therefore, by adjusting the relative position of the pogo pin 1000 to the center of the magnet 310 and the pogo pin 1000 to change the orientation of the lines of magnetic force acting on the pogo pin 1000, it is possible to contactlessly adjust the posture (angle or tilt) of the pogo pin 1000.

Referring to FIG. 5B, the magnet 310 according to an embodiment of the disclosure is shaped like a ring. When the magnet 310 is shaped like a ring, the lines of magnetic force are formed in vertical directions in a hollow formed in a center portion of the ring to increase magnetic flux, thereby allowing the posture of the pogo pin 1000 to be more easily adjusted.

However, such shapes of the magnet 310 are merely an example, and the magnet 310 may have various shapes as long as the lines of magnetic force are formed in vertical directions in the center thereof and the orientation of the lines of magnetic force is varied depending on the distances from the center. In other words, the magnet 310 may have various shapes as long as the posture of the pogo pin 1000 seated above the magnet 310 is adjustable by the magnetic force. For example, the magnet 310 may be shaped to have a polygonal cross-section and have a hole formed in the vertical direction so that the magnetic force can be concentrated in the center. Further, the magnet 310 may be shaped like a thin plate or a thick pillar.

Figure 6A:
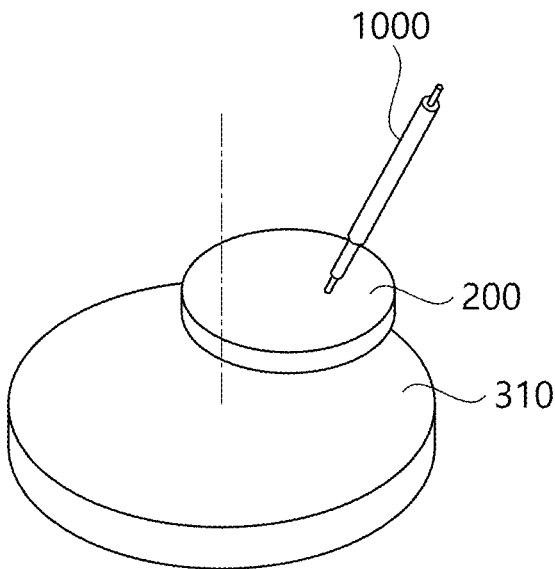
FIGS. 6A and 6B are conceptual views showing the posture of a pogo pin based on operations of a posture adjuster according to the disclosure.
Figure 6B:
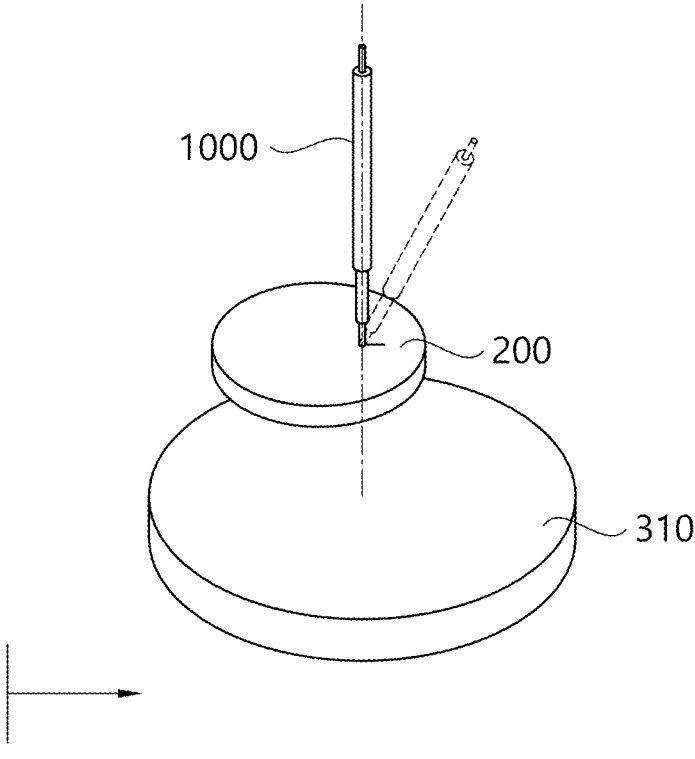

FIGS. 6A and 6B are conceptual views showing the posture of the pogo pin 1000 based on operations of the posture adjuster 300 according to the disclosure.

Referring to FIG. 6A, as described above, the pogo pin 1000 seated on the seating portion 200 may not be uprightly erected. Further, a contact point at which the pogo pin 1000 is in contact with the seating portion 200 may be spaced apart from the rotation center of the rotation actuator 520. The pogo pin 1000 may be kept at an angle tilted by the magnet 310 while its lower end is being in contact with seating portion 200.

Referring to FIG. 6b, when the position of the magnet 310 is adjusted in the horizontal direction, preferably, when the horizontal position of the lower end of the pogo pin 1000 is aligned with the central position of the magnet 310, the pogo pin 1000 is uprightly erected. In this way, the posture of the pogo pin 1000 is adjusted based on the magnetic force varied depending on the relative positions of the magnet 310.

Figure 7A:
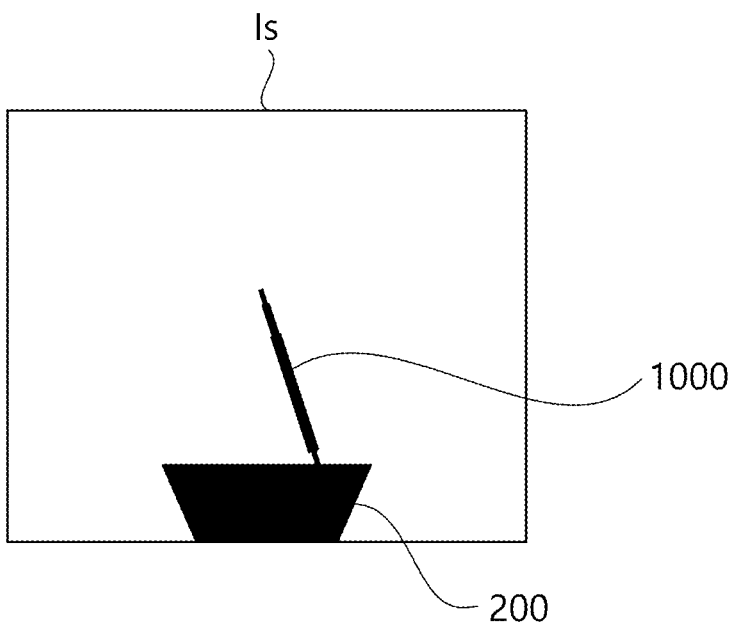
FIGS. 7A and 7B illustrate silhouette images acquired by a vision module according to the disclosure.
Figure 7B:
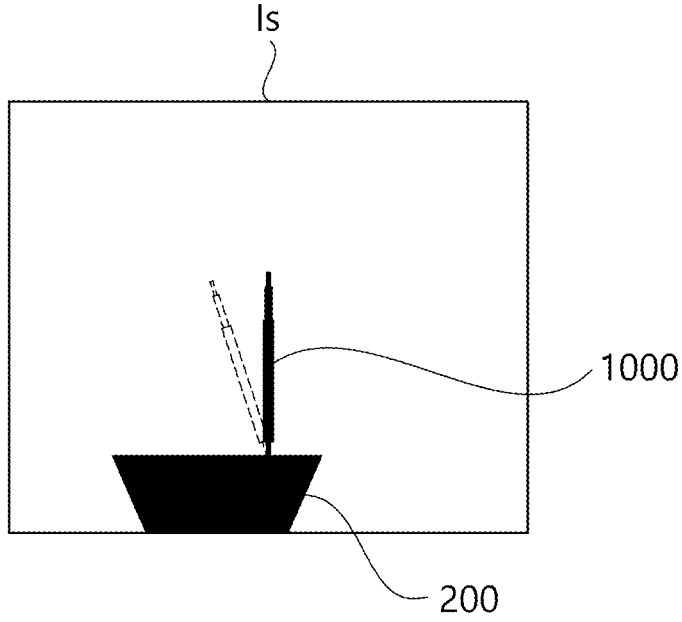

FIGS. 7A and 7B illustrate silhouette images acquired by the vision module according to the disclosure.

Referring to FIGS. 7A and 7B, the controller may control the operations of the posture adjuster 300 and/or the coaxial aligner 400 based on a silhouette image Is acquired using the first vision module 600. First, the controller operates the first camera 610 and the rear lighting unit 630 of the first vision module 600 to acquire the silhouette image Is of the pogo pin 1000. The image processor performs image analysis based on the acquired silhouette image Is. The image processor identifies the tilt of the pogo pin 1000 at the current rotation angle, and the position where the pogo pin 1000 is in contact with the seating portion 200, based on the silhouette image Is. The image processor extracts information about the tilt of the pogo pin 1000 for each angle and the position of the contact point from the silhouette image Is, and transmits the information to the controller. The controller controls the posture adjuster 300 and/or the coaxial aligner 400 based on the received information about the tilt for each angle and the position of the contact point. Further, the controller may change the rotation angle at least once until the pogo pin 1000 is uprightly erected and the center of the pogo pin 1000 is coaxially aligned with the rotation center. In this case, the position alignment may be immediately performed based on the silhouette image Is acquired in real time for each rotation angle.

Figure 8A:
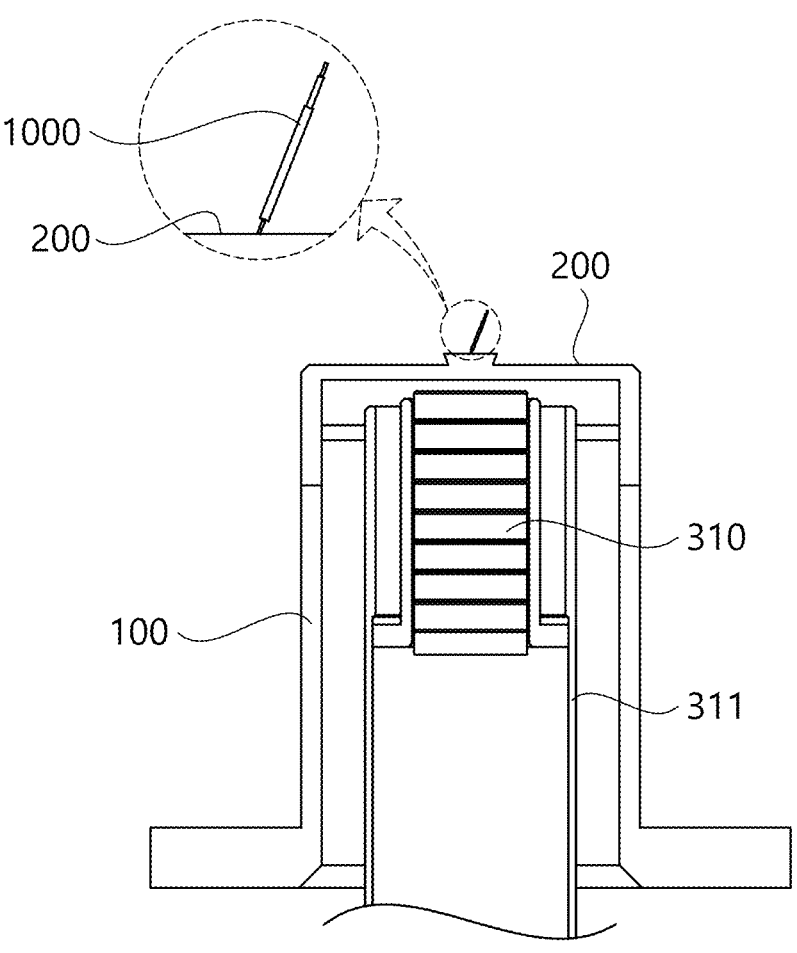
FIGS. 8A and 8B are cross-sectional views showing a state of using a posture adjuster according to the disclosure.
Figure 8B:
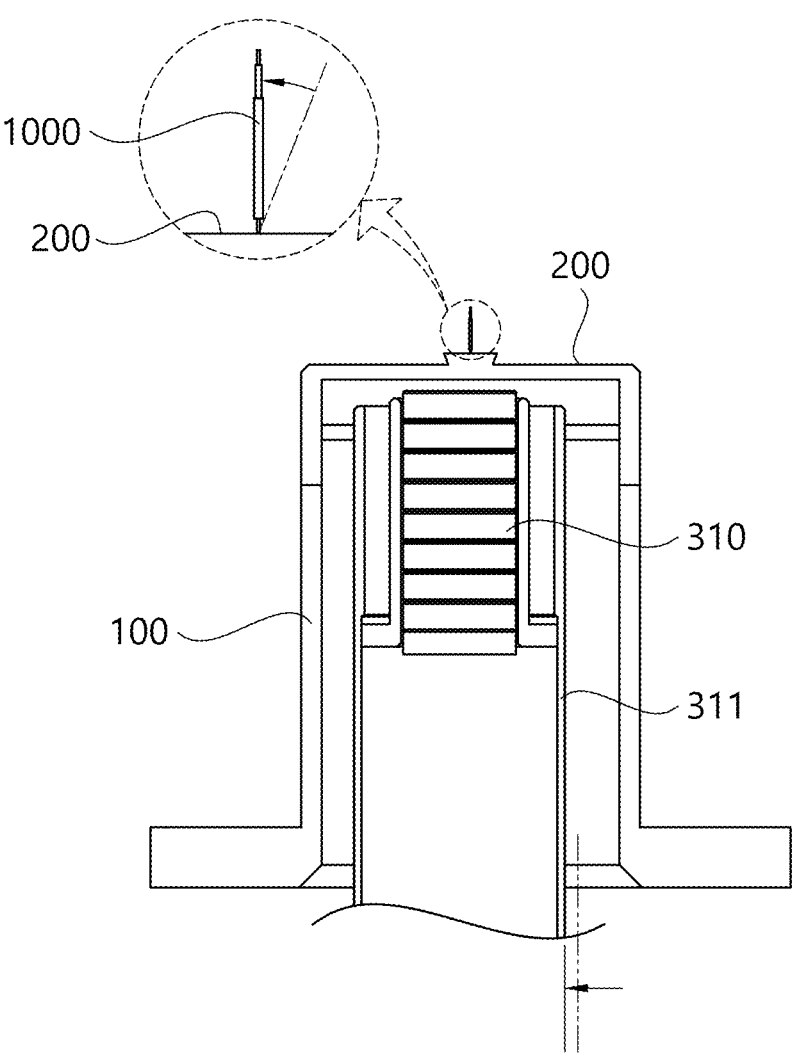

FIGS. 8A and 8B are cross-sectional views showing a state of using the posture adjuster according to the disclosure.

Referring to FIG. 8A, the pogo pin 1000 seated on the seating portion 200 is kept tilted. In this case, the pogo pin 1000 may be automatically transferred and seated on the seating portion 200, or may be manually seated on the seating portion 200.

Referring to FIG. 8B, the controller receives the extracted information about the tilt of the pogo pin 1000 from the image processor, and controls the operation of the posture adjuster 300 to uprightly erect the pogo pin 1000. For example, with respect to the pogo pin 1000 being in the state of in FIG. 8A, the controller may control the magnet 310 of the posture adjuster 300 to move to the left in FIG. 8B. As a result, the pogo pin 1000 becomes uprightly erect.

Figure 9A:
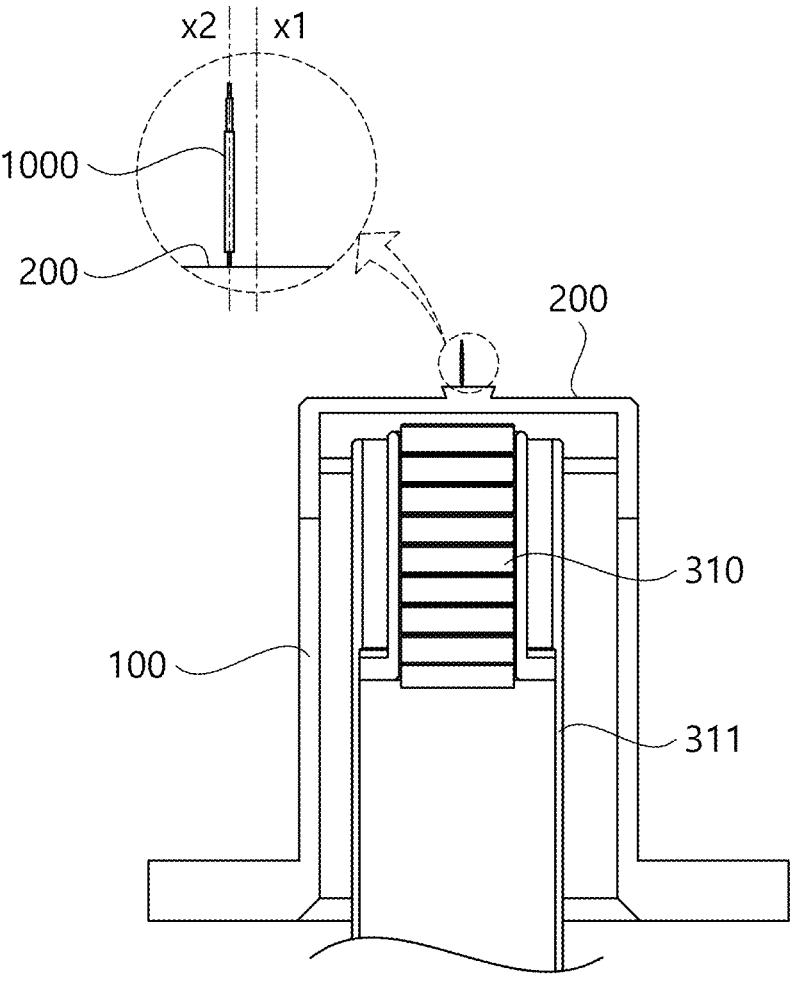
FIGS. 9A and 9B are cross-sectional views showing a state of using a coaxial aligner according to the disclosure.
Figure 9B:
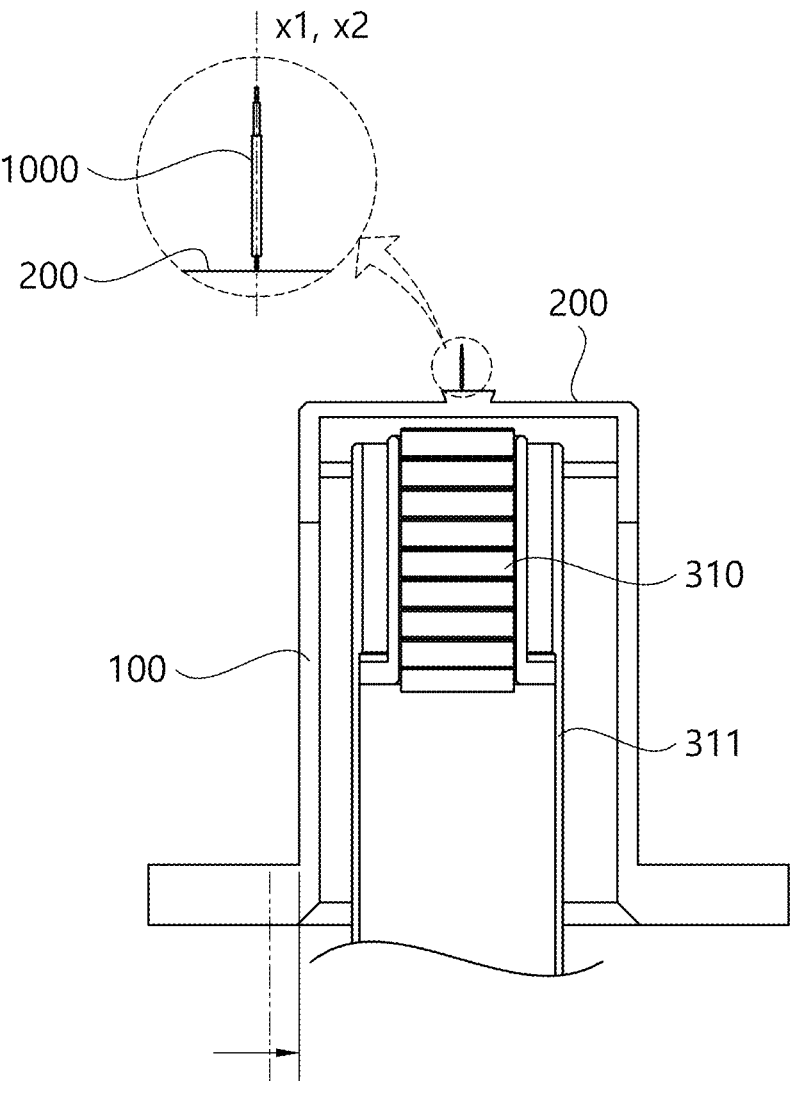

FIGS. 9A and 9B are cross-sectional views showing the state of using the coaxial aligner according to the disclosure.

Referring to FIG. 9A, when a central axis x1 of the rotation unit 500 is misaligned with a central axis x2 of the pogo pin 1000 being uprightly erected, the controller may perform control to coaxially algin the central axis x1 of the rotation unit 500 with the central axis x2 of the pogo pin 1000.

Referring to FIG. 9B, the controller operates the coaxial aligner 400 to align the central axis x2 of the pogo pin 1000 with the central axis x1 of the rotation unit 500.

The foregoing posture adjustment and coaxial alignment of the pogo pin 1000 may be performed multiple times at different angles by operating the rotation unit 500. For example, the controller may perform the control for the posture adjustment and the central axis alignment whenever the rotation unit 500 is rotated 90 degrees.

Figure 10:
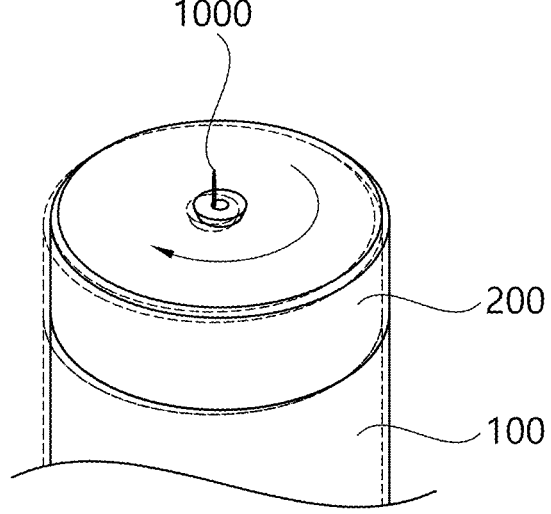
FIG. 10 illustrates an operation of rotating a pogo pin to acquire an inspection image after coaxial alignment according to the disclosure.

FIG. 10 illustrates an operation of rotating a pogo pin to acquire an inspection image after coaxial alignment according to the disclosure.

Referring to FIG. 10, the controller may first identify whether the pogo pin 1000 is uprightly erected and the central axis of the pogo pin 1000 is coaxially aligned with the central axis of the rotation unit 500, based on the information received from the image processor. When it is identified that the pogo pin 1000 is uprightly erected and the coaxial alignment is completed, the controller may operate the first vision module 600 and the second vision module 700 to acquire images. In this case, the controller may operate the rotation actuator 530 and control the vision modules to acquire the images of the pogo pin 1000 at each predetermined angle. In this case, the center of the seating portion 200 may be different from the center of the rotation unit 500, and thus the seating portion 200 may have eccentric movement as the rotation unit 500 rotates.

As described above, the inspection device 1 for the appearance of the pogo pins according to the disclosure can contactlessly adjust the posture of the pogo pin 1000 to become uprightly erect, and align the central axis of the pogo pin 1000.

The alignment of the pogo pin with the posture and position optimized for the appearance inspection enables the acquisition of the accurate inspection image and improves the accuracy of the inspection.

Further, the positioning and coaxial alignment are automatically performed, thereby ensuring speed in inspecting the appearance of the pogo pin.

According to the disclosure, an inspection device for the appearance of pogo pins ensures the accuracy and speed in inspecting the appearance of the pogo pin.

REFERENCE NUMERALS

1: inspection device for the appearance of pogo pins
1000: pogo pin
100: holding frame
200: seating portion
300: posture adjuster
310: magnet
400: coaxial aligner
500: rotation unit
600: first vision module
700: second vision module
x1: central axis of rotation unit
x2: central axis of pogo pin

What is claimed is:

1. An inspection device for an appearance of a pogo pin, comprising:

a seating portion configured to seat the pogo pin thereon;

a pogo pin posture adjuster configured to adjust a posture of the pogo pin based on magnetic force by adjusting a position of a magnet placed under the seating portion;

a rotation unit configured to rotate the seating portion;

a coaxial aligner configured to coaxially align a rotation center of the pogo pin with the rotation unit; and at least one vision module configured to acquire images of the pogo pin seated on the seating portion.

2. The inspection device of claim 1, wherein the vision module comprises a first vision module configured to acquire images of the pogo pin from a lateral side.

3. The inspection device of claim 2, wherein the first vision module comprises a first camera and a rear lighting unit provided on one side of an inspection area.

4. The inspection device of claim 3, wherein the first vision module comprises a first lighting unit configured to irradiate light toward a lateral surface of the pogo pin.

5. The inspection device of claim 4, wherein the posture adjuster is configured to rotate depending on the rotation unit.

6. The inspection device of claim 5, wherein the rotation unit rotates a predetermined angle to change an angle of the pogo pin, and the first vision module operates to acquire silhouette image whenever the pogo pin is rotated a predetermined angle.

7. The inspection device of claim 6, wherein the vision module is configured to acquire images of the pogo pin while the pogo pin is uprightly erected.

8. The inspection device of claim 7, wherein the first vision module operates to acquire lateral-view images of the pogo pin while the first lighting unit is operating.

9. The inspection device of claim 1, wherein the vision module comprises a second vision module configured to acquire images of the pogo pin from above.

10. The inspection device of claim 9, wherein the second vision module comprises a second camera, and a second lighting unit configured to irradiate light toward a top surface of the pogo pin.

11. The inspection device of claim 1, wherein the pogo pin posture adjuster comprises:

a first adjusting unit configured to adjust a position of the magnet in a first direction on a horizontal plane; and a second adjusting unit configured to adjust the position of the magnet in a second direction perpendicular to the first direction.

12. The inspection device of claim 11, wherein the first adjusting unit comprises a first upper portion, a first lower portion, and a guide configured to restrict a direction in which the first upper portion moves relative to the first lower portion.

13. The inspection device of claim 11, wherein the second adjusting unit comprises a second upper portion, a second lower portion, and a guide configured to restrict a direction in which the second upper portion moves relative to the second lower portion.

* * * * *